United States Patent
Kwasny et al.

(10) Patent No.: US 7,454,986 B2
(45) Date of Patent: Nov. 25, 2008

(54) DEVICE AND METHOD FOR MEASURING TORQUE IN AN ELECTROMECHANICAL STEERING SYSTEM

(75) Inventors: Olaf Kwasny, Salzgitter (DE); Klaus Wahnschaffe, Wolfsburg/Hattorf (DE); Holger Manz, Sickte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 42 days.

(21) Appl. No.: 11/072,096

(22) Filed: Mar. 4, 2005

(65) Prior Publication Data

US 2005/0182575 A1 Aug. 18, 2005

Related U.S. Application Data

(63) Continuation of application No. PCT/EP03/08038, filed on Jul. 23, 2003.

(30) Foreign Application Priority Data

Sep. 6, 2002 (DE) ............................... 102 44 068

(51) Int. Cl.
*G01L 3/00* (2006.01)
(52) U.S. Cl. .................................. 73/862.08
(58) Field of Classification Search .............. 73/862.08, 73/818
See application file for complete search history.

(56) References Cited

U.S. PATENT DOCUMENTS

| | | | |
|---|---|---|---|
| 539,287 A | | 5/1895 | McKeen |
| 5,040,629 A | * | 8/1991 | Matsuoka et al. ............ 180/446 |
| 5,239,490 A | | 8/1993 | Masaki et al. ................ 364/565 |
| 5,343,393 A | * | 8/1994 | Hirano et al. .................. 701/41 |
| 5,767,642 A | * | 6/1998 | Furukawa .................... 318/286 |
| 6,293,366 B1 | | 9/2001 | Chabaan et al. ............. 180/446 |
| 6,295,879 B1 | * | 10/2001 | Miller et al. ............. 73/862.08 |
| 6,354,396 B1 | * | 3/2002 | Horton et al. ............... 180/446 |
| 6,367,576 B1 | * | 4/2002 | Rodenas et al. ............. 180/446 |
| 6,370,459 B1 | * | 4/2002 | Phillips ....................... 701/41 |
| 6,389,342 B1 | * | 5/2002 | Kanda .......................... 701/41 |
| 6,422,335 B1 | * | 7/2002 | Miller ......................... 180/446 |
| 6,474,436 B1 | * | 11/2002 | Konigorski ................... 180/402 |

(Continued)

FOREIGN PATENT DOCUMENTS

| | | |
|---|---|---|
| DE | 4029828 C2 | 4/1991 |
| DE | 69218405 T2 | 10/1993 |
| DE | 10051864 A1 | 4/2002 |
| EP | 1 125 822 A1 | 8/2001 |
| EP | 1225118 | 7/2002 |

*Primary Examiner*—Edward Lefkowitz
*Assistant Examiner*—Octavia Davis
(74) *Attorney, Agent, or Firm*—Baker Botts L.L.P.

(57) ABSTRACT

A device and a method for measuring torque for an electromechanical steering system comprises a steering means that is connected in a driving manner to a steering mechanism via a torsion rod which is provided with an input shaft part (101) and an output shaft part (102), an electric servomotor for driving the steering mechanism, the driving activity by the servomotor causing a relative rotational displacement between the input shaft part (101) and the output shaft part (102), a sensor unit (53) for detecting a steering angle (d), a sensor unit (52) for detecting a rotor angle of the servomotor (2), and a virtual torque sensor (54) in which a steering moment ($\tau_s$) is determined from the steering angle (d) and the rotor angle.

13 Claims, 1 Drawing Sheet

U.S. PATENT DOCUMENTS 6,554,096 B2    4/2003   Tokumoto ................... 180/446
6,651,771 B2 * 11/2003   Chabaan .................... 180/446
6,845,309 B2 *  1/2005   Recker et al. ............... 701/41
6,854,558 B2 *  2/2005   Pauly et al. ................ 180/446
6,900,564 B2 *  5/2005   Kobayashi et al. ........... 310/83
6,945,352 B2 *  9/2005   Phillips .................... 180/422

* cited by examiner

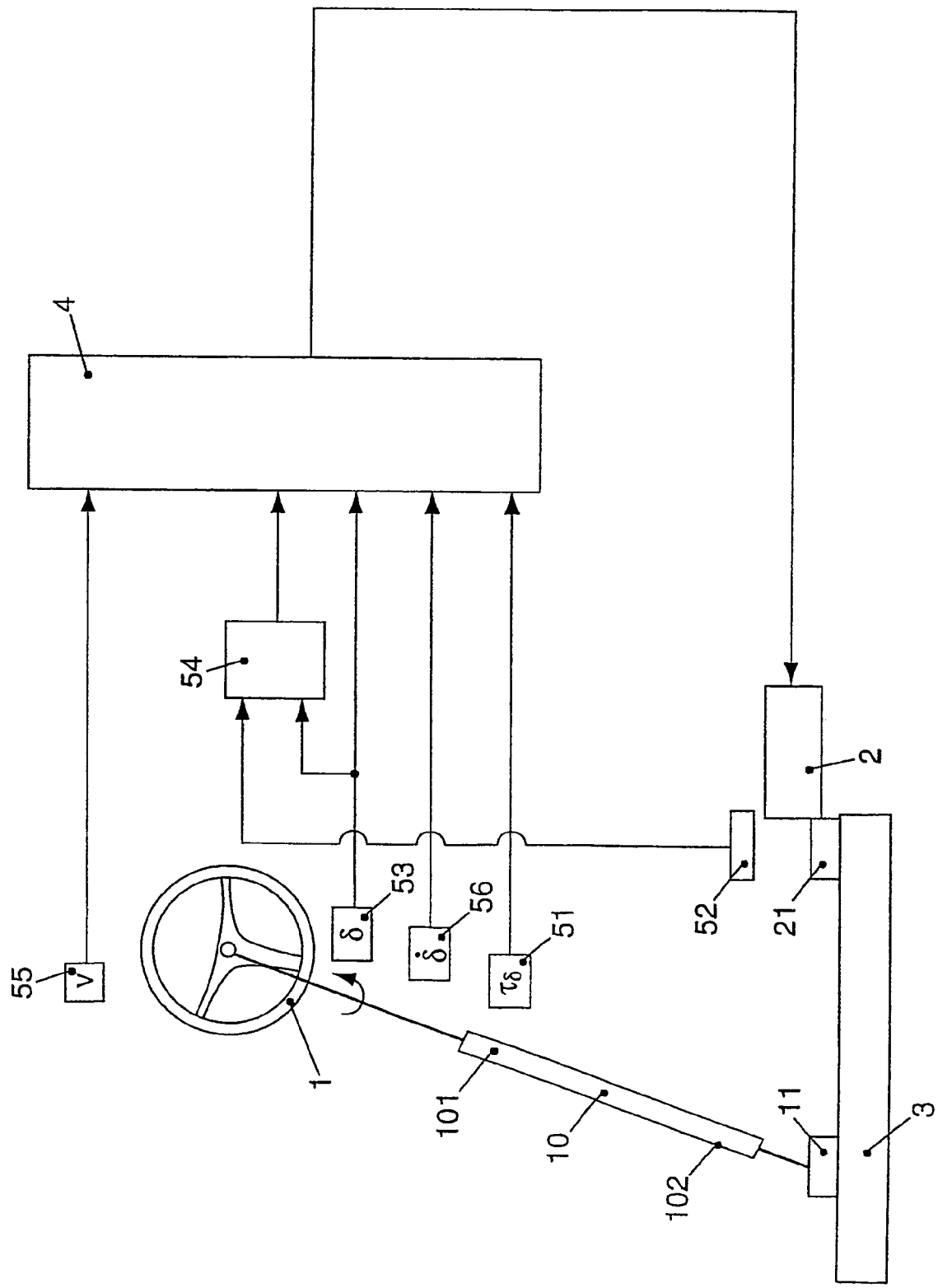

DEVICE AND METHOD FOR MEASURING TORQUE IN AN ELECTROMECHANICAL STEERING SYSTEM

CROSS REFERENCE TO RELATED APPLICATION

This application is a continuation of copending International Application No. PCT/EP2003/008038 filed Jul. 23, 2003 which designates the United States, and claims priority to German application no. 102 44 068.9 filed Sep. 6, 2002.

TECHNICAL FIELD OF THE INVENTION

The present invention relates to a device and a method for measuring torque in a vehicle with an electromechanical steering system.

A torque sensor is a basic component of an electromechanical steering system because power steering is not possible without determining torque. The torque sensor is therefore often backed by a redundant system and/or coupled with a safety device that immediately detects a failure and directly shuts down the system.

DESCRIPTION OF THE RELATED ART

DE 692 18 405 T2 reveals a torque sensor for an electromechanical steering system comprising a steering device that is connected drive-wise to the steering mechanism via a torsion bar to an input and an output shaft part, and an electrical servomotor to drive the steering mechanism, whereby the servomotor drive brings about a relative rotation shift between the input shaft part and the output shaft part and the torque sensor emits at least two independent signals and the signals are checked for correctness by way of comparison.

Redundancy is undesirable both for cost reasons and also because of space limitations.

SUMMARY OF THE INVENTION

The invention therefore is meant to solve the technical problem of creating a device and a method for measuring torque in a vehicle with an electromechanical steering system that can be implemented at low cost and with small space requirements.

This object can be achieved by a device for measuring torque for an electromechanical steering system, comprising a steering device that is connected drive-wise to a steering mechanism via a torsion bar to an input and an output shaft part, and an electrical servomotor to drive the steering mechanism, whereby the servomotor drive brings about a relative rotation shift between the input shaft part and the output shaft part, wherein an electromechanical steering system includes a sensor unit for obtaining the steering angle and a sensor unit for obtaining the rotor angle of the servomotor and takes the form of a virtual torque sensor as well as allows the virtual torque sensor to calculate the steering moment from the steering angle and the rotor angle.

The virtual torque sensor may take the form of a computing unit. The virtual torque sensor may take the form of an analog circuit. The sensor unit for obtaining the rotor angle may take the form of an optical or magnetostrictive encoder. The sensor unit for obtaining the steering angle can be integrated into the steering device.

The object can also be achieved by a method for measuring torque for an electromechanical steering system comprising a steering device that is connected drive-wise to the steering mechanism via a torsion bar to an input and an output shaft part, and an electrical servomotor to drive the steering mechanism, the method comprising the steps of obtaining a relative rotation shift between the input shaft part and the output shaft part by the servomotor drive, obtaining the steering angle and the rotor angle of the servomotor each by a respective sensor unit included in an electromechanical steering system, and determining a steering moment from the steering angle and the rotor angle within a virtual torque sensor formed within the electromechanical steering system.

The virtual torque sensor may take the form of a computing unit processing the sensor signals in digital form. The virtual torque sensor may take the form of an analog circuit processing the sensor signals in analog form. The sensor unit for obtaining the rotor angle may take the form of an optical or magnetostrictive encoder. The sensor unit for obtaining the steering angle can be integrated into the steering device.

The electromechanical steering system comprises a sensor unit for recording the steering angle and a sensor unit for recording the rotor angle of the servomotor and takes the form of a virtual torque sensor, whereby the virtual torque sensor calculates the steering moment from the steering angle and the rotor angle. The virtual torque sensor makes it possible to determine the torsion of the torsion bar and thus the steering moment.

The virtual torque sensor can be used as a backup system. The backup system makes it possible to avoid the immediate shutdown of the main system when the torque sensor fails, increasing thereby the safety of the electromechanical steering system. It is also conceivable to completely do without the use of a mechanical torque sensor and to calculate the torque exclusively with the virtual torque sensor. This requires a high resolution of the torque sensor and/or the rotor angle sensor.

In another embodiment the virtual torque sensor takes the form of a computing device. The computing device makes it possible to digitally process signals from the sensor units. In the process known methods of signal processing such as filter and/or smoothing processes can be used. The output signal of the torque sensor is available in digital form for further processing.

In another embodiment the virtual torque sensor takes the form of an analog circuit. Analog output signals from the sensor units can be processed directly without digitizing. The torque determined in analog form can be digitized via known methods for further processing.

In another embodiment the sensor unit for recording the rotor angle takes the form of an optical or magnetostrictive encoder. In this case the rotor angle is measured directly at the servomotor. It is also conceivable to calculate the angle after transmission via a gearbox.

In another embodiment the sensor unit for recording the steering angle is integrated into the steering device. This makes it for example possible to precisely measure the steering intention communicated by the driver via the steering wheel because long transmission lines are avoided. However, it is also conceivable to mount the sensor in a location that is more suitable in terms of space.

BRIEF DESCRIPTION OF THE DRAWINGS

The invention is explained in more detail in what follows with the help of a preferred embodiment. The single illustration shows:

FIG. 1 a basic illustration of an electromechanical steering system with power steering.

DETAILED DESCRIPTION OF THE PREFERRED EMBODIMENTS

FIG. 1 shows a basic illustration of an electromechanical steering system with power steering including a steering device 1 in the form of a steering wheel and a servomotor 2, both connected to a rack 3 via a gear 11, 21. The rack 3 is connected to the steerable wheels of a vehicle, not shown, via a known steering connection, also not shown, so that it can be controlled. The steering device 1 has a working connection to the input shaft part 101 of a torsion bar 10. The output shaft part 102 of the torsion bar 10 has a working connection to the rack 3 via the gearbox 11. For power steering the servomotor 2 also provides the power support calculated in a computing unit 4. An additional movement of the rack 3 via the servomotor 2 results in a rotational movement of the output shaft part 102 relative to the input shaft part 101 and thus in a torque applied to the torsion bar 10. The torque of the torsion bar 10 can be measured with a known torque sensor 51. In addition, according to the invention the sensors 52, 53 record the rotor angle of the servomotor and the steering angle, allowing one to calculate thereby the adjacent torque in the virtual torque sensor 54, with the torque being proportional to the difference between the steering angle and the rotor angle. The virtual torque sensor 54 can be implemented as a digital computing unit and/or through an analog circuit. The virtual torque sensor 54 serves as a backup system in case the torque sensor 51 fails. It can be made as a separate component, as shown, or integrated into the computing unit 4. The driving behavior of a vehicle can be described by way of driving speed v, steering angle δ, steering angle velocity δ° and steering moment $\tau_\delta$. The driving speed is determined through a sensor 55, e.g. a tachometer. The steering angle velocity δ° is determined through a sensor 56. However, it is also conceivable to determine the steering angle velocity δ° by derivation from the steering angle δ. All recorded values of the driving behavior are fed into the computing unit 4. The computing unit 4 calculates a support moment based on these data which in turn are fed into the servomotor 2.

We claim:

1. A steering system comprising:
 a steering device that is connected drive-wise to a steering mechanism via a torsion bar to an input and an output shaft part, and an electrical servomotor to drive the steering mechanism, wherein the servomotor drive brings about a relative rotation shift between the input shaft part and the output shaft part;
 a main system for measuring torque in the torsion bar comprising a torque sensor; and
 a backup system for measuring torque in the torsion bar comprising a sensor unit for obtaining the steering angle and a sensor unit for obtaining the rotor angle of the servomotor and takes the form of a virtual torque sensor as well as allows the virtual torque sensor to calculate the steering moment from the steering angle and the rotor angle, wherein the steering torque is determined from the difference between the steering angle and the rotor angle.

2. The steering system according to claim 1, wherein the virtual torque sensor takes the form of a computing unit.

3. The steering system according to claim 1, wherein the virtual torque sensor takes the form of an analog circuit.

4. The steering system according to claim 1, wherein the sensor unit for obtaining the rotor angle takes the form of an optical or magnetostrictive encoder.

5. The steering system according to claim 1, wherein the sensor unit for obtaining the steering angle is integrated into the steering device.

6. A method for measuring torque for an electromechanical steering system comprising a steering device that is connected drive-wise to the steering mechanism via a torsion bar to an input and an output shaft part, and an electrical servomotor to drive the steering mechanism, the method comprising the steps of:
 measuring torque in the torsion bar by measuring the torque directly with a torque sensor; and
 measuring torque in the torsion bar by measuring the torque virtually with a virtual torque sensor by a method comprising the steps of:
  obtaining a relative rotation shift between the input shaft part and the output shaft part by the servomotor drive;
  obtaining the steering angle and the rotor angle of the servomotor each by a respective sensor unit included in an electromechanical steering system; and
  determining a steering moment from the steering angle and the rotor angle within the virtual torque sensor formed within the electromechanical steering system, wherein the steering torque is determined from the difference between the steering angle and the rotor angle.

7. The method according to claim 6, wherein the virtual torque sensor takes the form of a computing unit processing the sensor signals in digital form.

8. The method according to claim 6, wherein the virtual torque sensor takes the form of an analog circuit processing the sensor signals in analog form.

9. The method according to claim 6, wherein the sensor unit for obtaining the rotor angle takes the form of an optical or magnetostrictive encoder.

10. The method according to claim 6, wherein the sensor unit for obtaining the steering angle is integrated into the steering device.

11. A steering system comprising: a steering device that is connected drive-wise to a steering mechanism via a torsion bar to an input and an output shaft part, and an electrical servomotor to drive the steering mechanism, whereby the servomotor drive brings about a relative rotation shift between the input shaft part and the output shaft part;
 a main system for measuring torque in the torsion bar comprising a torque sensor; and
 a backup system for measuring torque in the torsion bar comprising a sensor unit for obtaining the steering angle and a sensor unit for obtaining the rotor angle of the servomotor and takes the form of a virtual torque sensor as well as allows the virtual torque sensor to calculate the steering moment from the steering angle and the rotor angle, wherein the sensor unit for obtaining the rotor angle is formed by an optical or magnetostrictive encoder and the sensor unit for obtaining the steering angle is integrated into the steering device, wherein the steering torque is determined from the difference between the steering angle and the rotor angle.

12. The steering system according to claim 11, wherein the virtual torque sensor takes the form of a computing unit.

13. The steering system according to claim 11, wherein the virtual torque sensor takes the form of an analog circuit.

* * * * *